(12) United States Patent
Tanaka

(10) Patent No.: US 9,817,633 B2
(45) Date of Patent: Nov. 14, 2017

(54) INFORMATION PROCESSING APPARATUS AND INFORMATION PROCESSING METHOD

(71) Applicant: CANON KABUSHIKI KAISHA, Tokyo (JP)

(72) Inventor: Tomonori Tanaka, Ageo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 611 days.

(21) Appl. No.: 14/170,712

(22) Filed: Feb. 3, 2014

(65) Prior Publication Data

US 2014/0229837 A1    Aug. 14, 2014

(30) Foreign Application Priority Data

Feb. 8, 2013   (JP) .................................. 2013-023827

(51) Int. Cl.
```
G06F 3/16        (2006.01)
G10L 13/00       (2006.01)
G10L 21/0356     (2013.01)
```

(52) U.S. Cl.
CPC .............. G06F 3/167 (2013.01); *G06F 3/165* (2013.01); *G10L 13/00* (2013.01); *G10L 21/0356* (2013.01)

(58) Field of Classification Search
CPC ......... G06F 3/165; G06F 3/167; G10L 13/00; G10L 21/0356
See application file for complete search history.

(56) References Cited

U.S. PATENT DOCUMENTS

| | | | | |
|---|---|---|---|---|
| 8,290,777 B1* | 10/2012 | Nguyen | .................. | G10L 13/00 345/156 |
| 2013/0212454 A1* | 8/2013 | Casey | .................... | G06Q 10/10 715/203 |
| 2014/0142954 A1* | 5/2014 | Cameron | ......... | G11B 20/10527 704/276 |

FOREIGN PATENT DOCUMENTS

| | | | |
|---|---|---|---|
| JP | 2000-165521 | * | 11/1998 |
| JP | 2000-165521 A | | 6/2000 |
| JP | 2006227846 A | | 8/2006 |
| JP | 2010256832 A | | 11/2010 |

OTHER PUBLICATIONS

Office Action issued in Japanese Patent Application No. 2013023827, dated Dec. 9, 2016.

* cited by examiner

*Primary Examiner* — Sherrod Keaton
(74) *Attorney, Agent, or Firm* — Rossi, Kimms & McDowell LLP

(57) ABSTRACT

Upon detecting input of an instruction to change a display layout of a document on a display screen, display control of the document on the display screen is performed so that a character output as a voice by a voice output unit at the time of detection is displayed on the display screen.

11 Claims, 12 Drawing Sheets

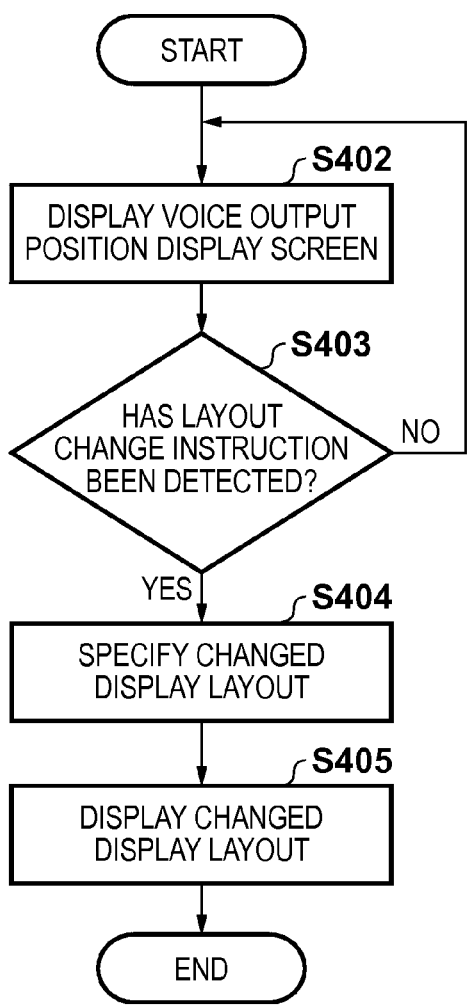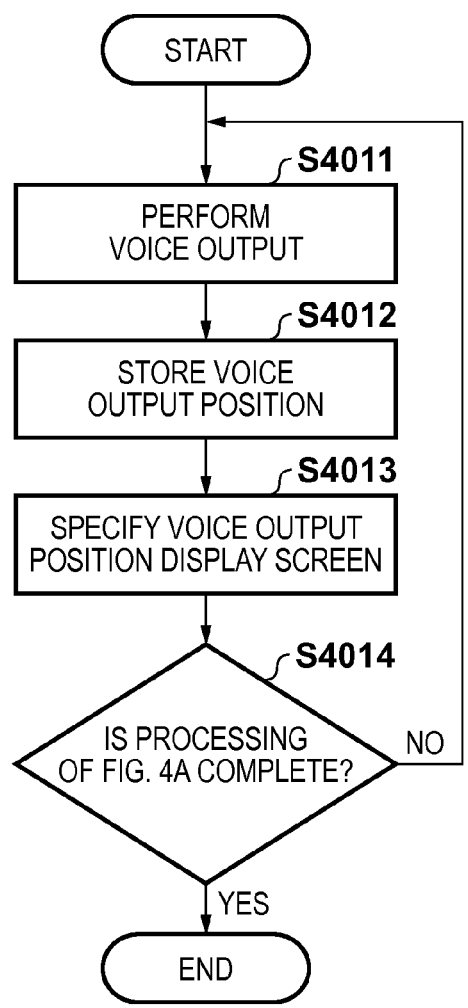
FIG. 4A
FIG. 4B

F I G. 10A
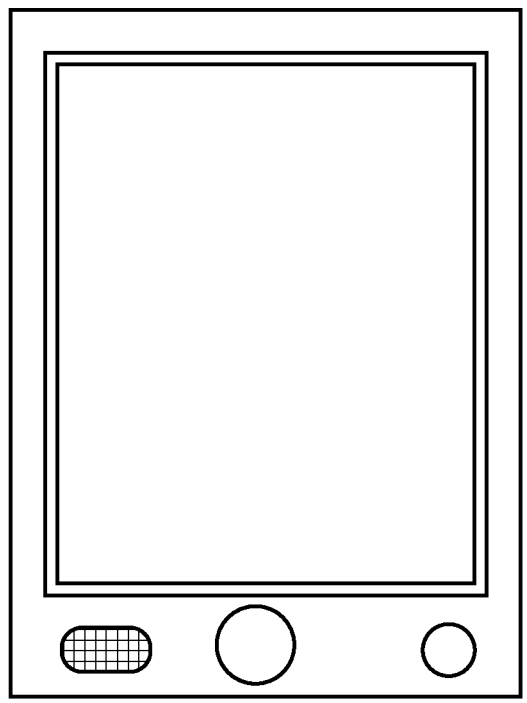
F I G. 10B
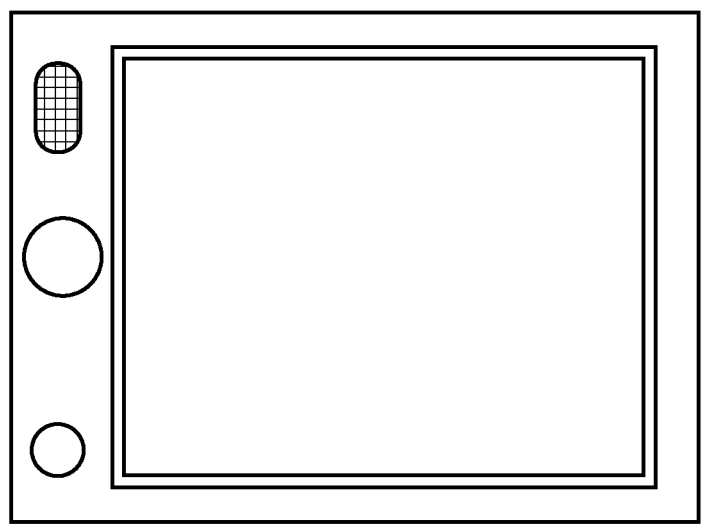

FIG. 11A

| PAGE NUMBER | BLOCK ID | LINE COUNT | CHARACTER COUNT FROM START CHARACTER OF LINE |
|---|---|---|---|
| 5 | 1 | 1 | 1 |

FIG. 11B

| PAGE NUMBER | BLOCK ID | LINE COUNT | CHARACTER COUNT FROM START CHARACTER OF LINE |
|---|---|---|---|
| 5 | 1 | 4 | 6 |

INFORMATION PROCESSING APPARATUS AND INFORMATION PROCESSING METHOD

BACKGROUND OF THE INVENTION

Field of the Invention

The present invention relates to a technique for outputting a displayed sentence as a voice.

Description of the Related Art

Conventionally, there has been known a technique of outputting an electronic text content as a voice. There is also provided a method of displaying a display layout associated with an electronic text content on a display screen (for example, Japanese Patent Laid-Open No. 2000-165521).

In the conventional method, however, when a display layout is changed during voice output, the display layout does not change according to a voice output position. Therefore, the problem that the voice output position is not arranged within the changed display layout arises.

SUMMARY OF THE INVENTION

The present invention has been made in consideration of the above problem, and provides a technique of changing a display layout according to a voice output position even if the display layout is changed during voice output.

According to the first aspect of the present invention, an information processing apparatus which includes a display screen configured to display a document and a voice output unit configured to output each character in the document as a voice, comprises: a display control unit configured to, upon detecting input of an instruction to change a display layout of the document on the display screen, perform display control of the document on the display screen so that a character output as a voice by the voice output unit at the time of detection is displayed on the display screen.

According to the second aspect of the present invention, an information processing method to be executed by an information processing apparatus which includes a display screen configured to display a document and a voice output unit configured to output each character in the document as a voice, comprises: performing, upon detecting input of an instruction to change a display layout of the document on the display screen, display control of the document on the display screen so that a character output as a voice by the voice output unit at the time of detection is displayed on the display screen.

According to the third aspect of the present invention, an information processing apparatus which includes a display screen configured to display a document and a voice output unit configured to output each character in the document as a voice, comprises: a display control unit configured to, upon detecting input of an instruction to change a display layout of the document on the display screen, perform display control of the document on the display screen based on a position of a character output as a voice by the voice output unit at the time of detection.

According to the fourth aspect of the present invention, an information processing method to be executed by an information processing apparatus which includes a display screen configured to display a document and a voice output unit configured to output each character in the document as a voice, comprises: performing, upon detecting input of an instruction to change a display layout of the document on the display screen, display control of the document on the display screen based on a position of a character output as a voice by the voice output unit at the time of detection.

Further features of the present invention will become apparent from the following description of exemplary embodiments with reference to the attached drawings.

BRIEF DESCRIPTION OF THE DRAWINGS

FIGS. 4A and 4B are flowcharts each illustrating processing executed by the information processing apparatus 101;

FIGS. 10A and 10B are views for explaining a portrait orientation operation and a landscape orientation operation, respectively;

FIGS. 11A and 11B are views each showing an example of the arrangement of a voice output position;

DESCRIPTION OF THE EMBODIMENTS

Embodiments of the present invention will be described below with reference to the accompanying drawings. Note that the embodiments to be described below are merely examples when the present invention is practiced concretely, and are detailed embodiments of arrangements described in the appended claims.

First Embodiment

Figure 1:
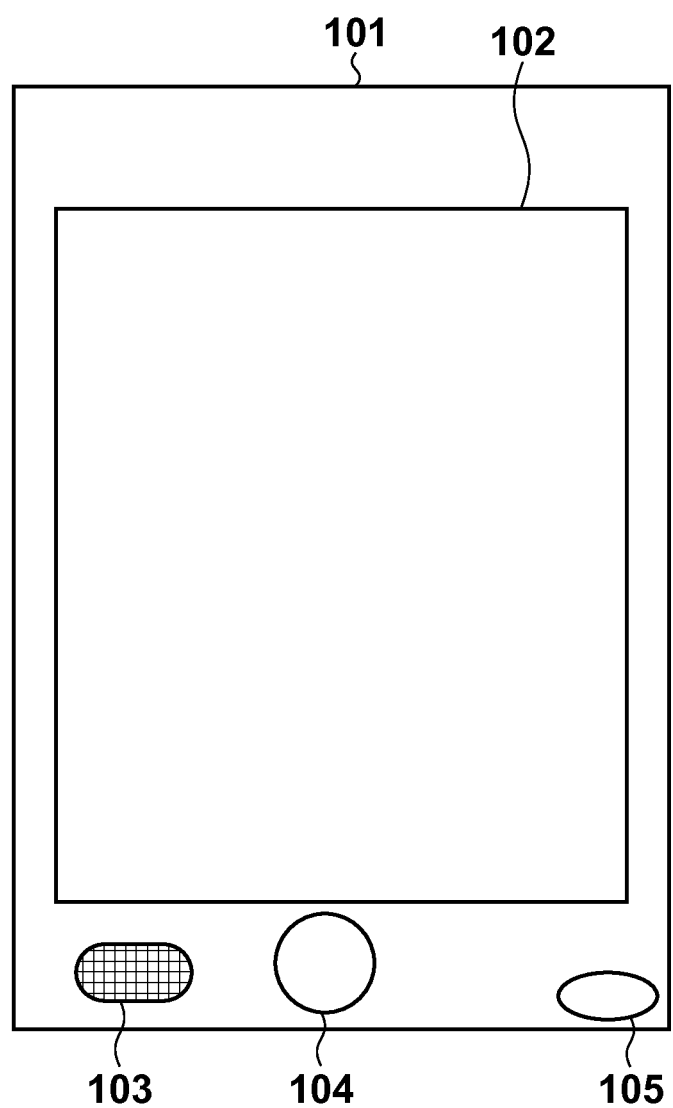
FIG. 1 is a view showing an example of the outer appearance of an information processing apparatus.

First, an example of the outer appearance of an information processing apparatus according to the embodiment will be explained with reference to FIG. 1. An information processing apparatus 101 shown in FIG. 1 includes a touch panel screen 102, a loudspeaker 103, a voice output button 104, and an acceleration sensor 105. Note that the outer appearance of the information processing apparatus 101 is not limited to that shown in FIG. 1 and various outer appearances are applicable. That is, the arrangement of the touch panel screen 102, loudspeaker 103, voice output button 104, and acceleration sensor 105 is not limited to that shown in FIG. 1. Furthermore, the number of buttons, loudspeakers, or the like may be increased/decreased in accordance with an application purpose.

The touch panel screen 102 functions as a display screen for displaying images and characters, and also functions as a so-called touch panel for detecting a touch operation by a pointer such as a user's finger.

The voice output button 104 is a button used to input a voice output instruction to the information processing apparatus 101. The user of the apparatus can input the voice output instruction to the information processing apparatus 101 by pressing the voice output button 104.

Upon receiving the voice output instruction, the information processing apparatus outputs characters constituting a sentence displayed on the touch panel screen 102 as a voice in the order of the characters. At this time, the voice is output through the loudspeaker 103. The output voice is, for example, a voice based on WAVE data of a PCM format sampled at 22.05 kHz.

The acceleration sensor 105 measures the acceleration of the information processing apparatus 101. The measured acceleration is used to obtain a change in posture (orientation) of the information processing apparatus 101. In this embodiment, therefore, any sensor (which is not limited to a sensor) may be used instead of the acceleration sensor 105 as long as it can detect a change in posture of the information processing apparatus 101 (a change in rotation of the information processing apparatus 101 within the display surface of the touch panel screen 102).

In this embodiment, assume that electronic book data (an electronic book content, electronic text content, or electronic content) and data of a speech wave obtained by reading aloud the electronic book (speech wave data) are downloaded in advance into the memory of the information processing apparatus 101. However, the present invention is not limited to this. For example, these data may be stored in an external apparatus, and downloaded into the memory of the information processing apparatus 101 from the external apparatus, as needed.

Assume that an electronic book of this embodiment is described using SMIL (Synchronized Multimedia Integration Language) as a markup language compliant with XML of the W3C. Each character in each page in an electronic book and a speech wave position (voice output position) where the character is uttered in speech wave data are associated with each other (synchronized with each other). That is, in the speech wave data, speech wave data of an arbitrary character in an arbitrary page in an electronic book can be uniquely specified. Also, assume that, for example, it is possible to acquire information such as a page number, block ID, line count, and character count from the start character of a line from SMIL description information. Furthermore, assume that the information such as a page number, block ID, line count, and character count from the start position of a line is collated with the SMIL description information, thereby making it possible to specify a voice output position on speech wave data and a sentence to which the voice output position belongs. Since the SMIL technique is known, a description thereof will be omitted. The following processing assumes that such SMIL function is used, as needed.

Figure 2:
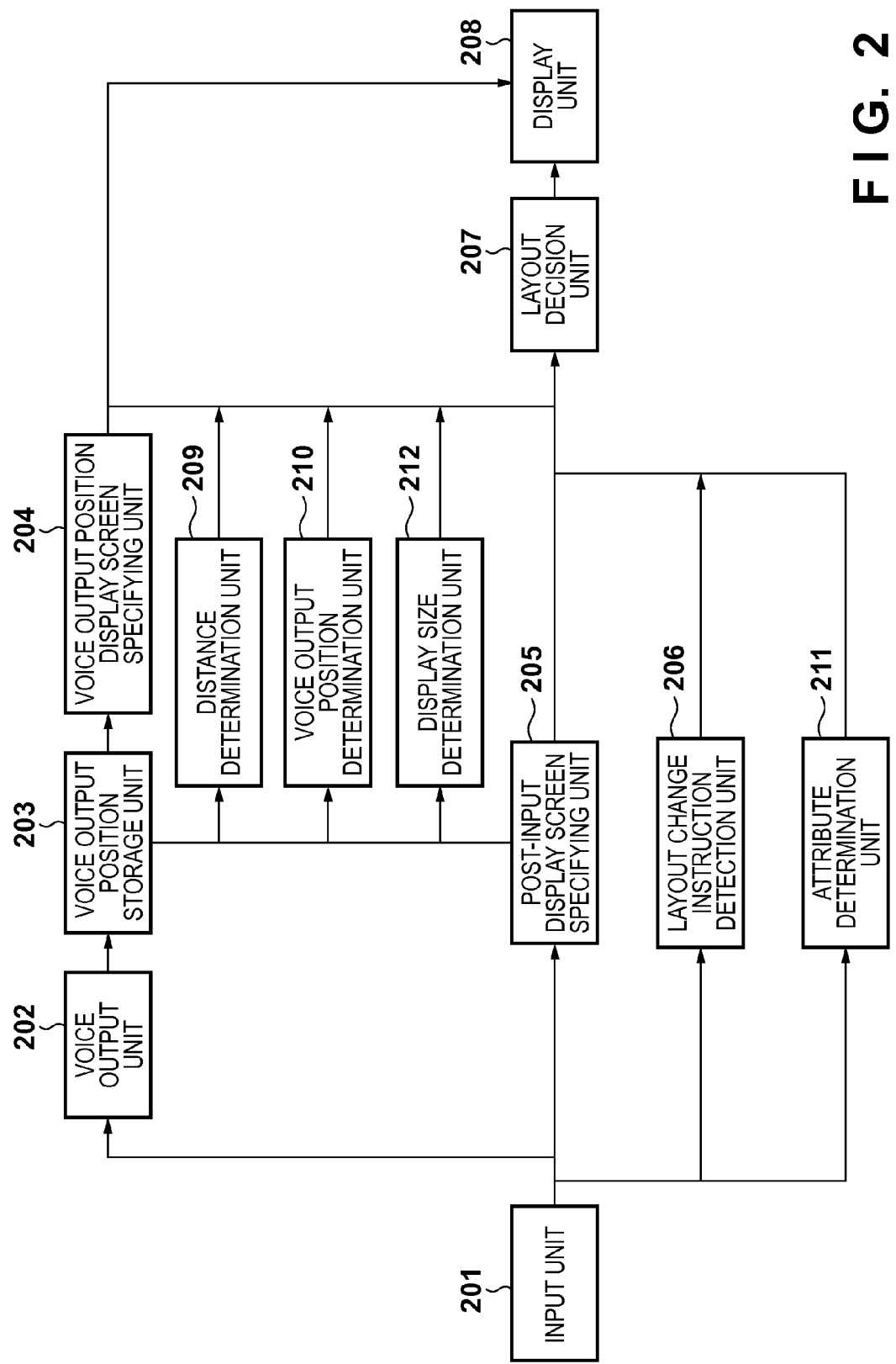
FIG. 2 is a block diagram showing an example of the functional arrangement of an information processing apparatus 101.

The functional arrangement of the information processing apparatus 101 will be described next with reference to a block diagram shown in FIG. 2. Note that a functional arrangement shown in FIG. 2 is merely an example. Some of functional units shown in FIG. 2 may be integrated into one functional unit, and any other arrangements may be adopted as long as they can implement respective processes to be described hereinafter.

FIG. 2 is used not only for a description of this embodiment but also for a description of various modifications of this embodiment. Therefore, FIG. 2 shows the arrangement applicable to all the modifications as well as this embodiment. Since some of the functional units shown in FIG. 2 are not used depending on an application target, not all the functional units shown in FIG. 2 are essential and some functional units may be omitted depending on an application target, as needed. Only functional units used in this embodiment will be explained below. Other functional units which are not used in this embodiment will be described in a modification in which they are used.

An input unit 201 is used to detect various input operations for the information processing apparatus 101. Examples of an input operation for the information processing apparatus 101 are an operation (touch operation) for the touch panel screen 102, an orientation operation for the main body of the information processing apparatus 101, and an operation of pressing the voice output button 104.

When, for example, the user touches the touch panel screen 102 by a pointer such as a finger, or performs a touch operation of sliding the pointer rightward, leftward, upward, downward, or the like on the touch panel screen 102, the input unit 201 detects the touch operation.

Assume that the user picks up the information processing apparatus 101 to set it in the portrait orientation (portrait orientation operation), as shown in FIG. 10A, or to set it in the landscape orientation (landscape orientation operation), as shown in FIG. 10B. Since the input unit 201 can detect a change in posture of the information processing apparatus 101 based on the acceleration measured by the acceleration sensor 105 using a well-known technique, it can detect the portrait orientation operation or landscape orientation operation.

A voice output unit 202 sequentially supplies voice signals based on speech wave data corresponding to a character at a voice output start position (in this embodiment, the start character of a block with a block ID=1 is set as a voice output start position) and characters at subsequent character positions to the loudspeaker 103. Upon completion of voice output of all of an electronic book content within the block, the block ID is incremented by one (for example, the block ID is changed from 1 to 2), and an electronic book content with the incremented block ID is output as a voice from a start character in the same manner.

A voice output position storage unit 203 refers to SMIL description information to specify information of a page number, block ID, line count, and character count from the start character of a line, which indicates the position (voice output position) of a character currently output as a voice by the voice output unit 202. The voice output position storage unit 203 then stores the specified voice output position in the memory of the information processing apparatus 101. Assume, for example, that the voice output unit 202 currently outputs as a voice the second character on the third line of the block with the block ID=1 in the fifth page of the electronic book content. At this time, the voice output position storage unit 203 stores "page number=5, block ID=1, line count=3, character count from start character of line=2" as the voice output position in the memory.

Based on the voice output position stored in the memory by the voice output position storage unit 203, a voice output position display screen specifying unit 204 specifies the display screen of the electronic book (voice output position display screen) to be displayed on the touch panel screen 102. For example, the unit 204 specifies, as a display target screen, an electronic book display screen where the start character of the block to which the character currently output as a voice belongs is positioned at the upper left corner of the touch panel screen 102 (the upper left corner of the touch panel screen 102 from the viewpoint of the user who is browsing the touch panel screen 102).

When the input unit 201 detects a landscape orientation operation or portrait orientation operation, a layout change instruction detection unit 206 notifies a layout decision unit 207 of the detected operation as a layout change instruction.

Upon receiving a notification that a landscape orientation operation has been performed, the layout decision unit 207 specifies a display layout (screen) in which the electronic book can be browsed on the touch panel screen 102 placed in the landscape orientation and the character currently output as a voice is displayed on the touch panel screen 102. Alternatively, upon receiving a notification that a portrait orientation operation has been performed, the layout decision unit 207 specifies a display layout (screen) in which the electronic book can be browsed on the touch panel screen 102 placed in the portrait orientation and the character currently output as a voice is displayed on the touch panel screen 102.

A display unit 208 supplies a video signal of the screen (that is, the display screen of the electronic book content) specified by the voice output position display screen specifying unit 204 or the layout decision unit 207 to the touch panel screen 102.

Processing executed by the information processing apparatus 101 according to this embodiment will be described with reference to FIGS. 4A and 4B showing flowcharts of the processing. Note that in the following description, the Nth (N≥1) page (to be referred to as page N) in the electronic book content is displayed on the touch panel screen 102 and the Nth page has not been output as a voice yet. Furthermore, the information processing apparatus 101 has undergone a portrait orientation operation, and page N is displayed in a display layout in the portrait orientation on the touch panel screen 102.

The block with the block ID=1 is displayed on the touch panel screen 102 so that the start character of the block is positioned at the upper left corner of the touch panel screen 102, and the font size is 4 mm. When the user presses the voice output button 104 in this state, the input unit 201 notifies the voice output unit 202 that the voice output button 104 has been pressed, thereby simultaneously starting processes according to the flowcharts shown in FIGS. 4A and 4B.

In step S4011 for the first time, the voice output unit 202 supplies a voice signal based on the speech wave data of a character at a voice output start position (the character position of the start character of the block with the block ID=1) to the loudspeaker 103. In step S4011 for the second time and thereafter, the voice output unit 202 supplies a voice signal based on the speech wave data of a character at each character position subsequent to the voice output start position to the loudspeaker 103. Every time the voice output unit 202 supplies a voice signal based on speech wave data to the loudspeaker 103, it increments the character position of a voice output target character by one, thereby setting a character subsequent to the character as a next voice output target.

In step S4012, the voice output position storage unit 203 stores the voice output position of the character set as a voice output target in step S4011 in the memory.

In step S4013, the voice output position display screen specifying unit 204 specifies an electronic book display screen where the character at the voice output position stored in step S4012 is displayed on the touch panel screen 102. For example, as described above, the unit 204 specifies an electronic book display screen where the start character of a block to which the character at the voice output position stored in step S4012 is positioned at the upper left corner of the touch panel screen 102.

Unless the processing according to the flowchart shown in FIG. 4A is not complete, the process returns to step S4011. Upon completion of the processing according to the flowchart shown in FIG. 4A, the processing according to the flowchart shown in FIG. 4B is also complete.

As described above, when a voice output instruction is input by pressing the voice output button 104, and page N displayed on the touch panel screen 102 upon input of the instruction is set as a voice output page, and voices corresponding to respective characters in the voice output page are sequentially output in the order of the characters. A screen to be displayed on the touch panel screen 102 is decided according to the position of a character currently output as a voice, as needed.

On the other hand, in step S402, every time a display screen is specified in step S4013, the display unit 208 sends a video signal of the display screen to the touch panel screen 102, thereby displaying the display screen on the touch panel screen 102.

In step S403, based on the acceleration measured by the acceleration sensor 105, the input unit 201 determines whether a portrait orientation operation or landscape orientation operation has been performed. If it is determined that a portrait orientation operation or landscape orientation operation has been performed, the input unit 201 notifies the layout change instruction detection unit 206 of a layout change instruction. If the layout change instruction detection unit 206 detects the notification of the layout change instruction, the process advances to step S404; otherwise, the process returns to step S402.

Upon receiving the notification that the landscape orientation operation has been performed from the layout change instruction detection unit 206, in step S404 the layout decision unit 207 specifies the following screen as the display screen of the electronic book to be displayed on the touch panel screen 102. That is, the unit 207 specifies a screen in a display layout in which the electronic book can be browsed on the touch panel screen 102 placed in the landscape orientation and the character currently output as a voice is displayed on the touch panel screen 102. On the other hand, upon receiving the notification that the portrait orientation operation has been performed from the layout change instruction detection unit 206, the layout decision unit 207 specifies the following screen as the display screen of the electronic book to be displayed on the touch panel screen 102. That is, the unit 207 specifies a screen in a display layout in which the electronic book can be browsed on the touch panel screen 102 placed in the portrait orientation and the character currently output as a voice is displayed on the touch panel screen 102.

In step S405, the display unit 208 sends a video signal of the electronic book display screen specified by the layout decision unit 207 to the touch panel screen 102, thereby displaying the display screen on the touch panel screen 102.

After that, unless a layout change instruction is sent, the processing in steps S404 and S405 is repeatedly executed every time the voice output position changes. If a layout change instruction is sent, the process returns to step S402.

Figure 9:
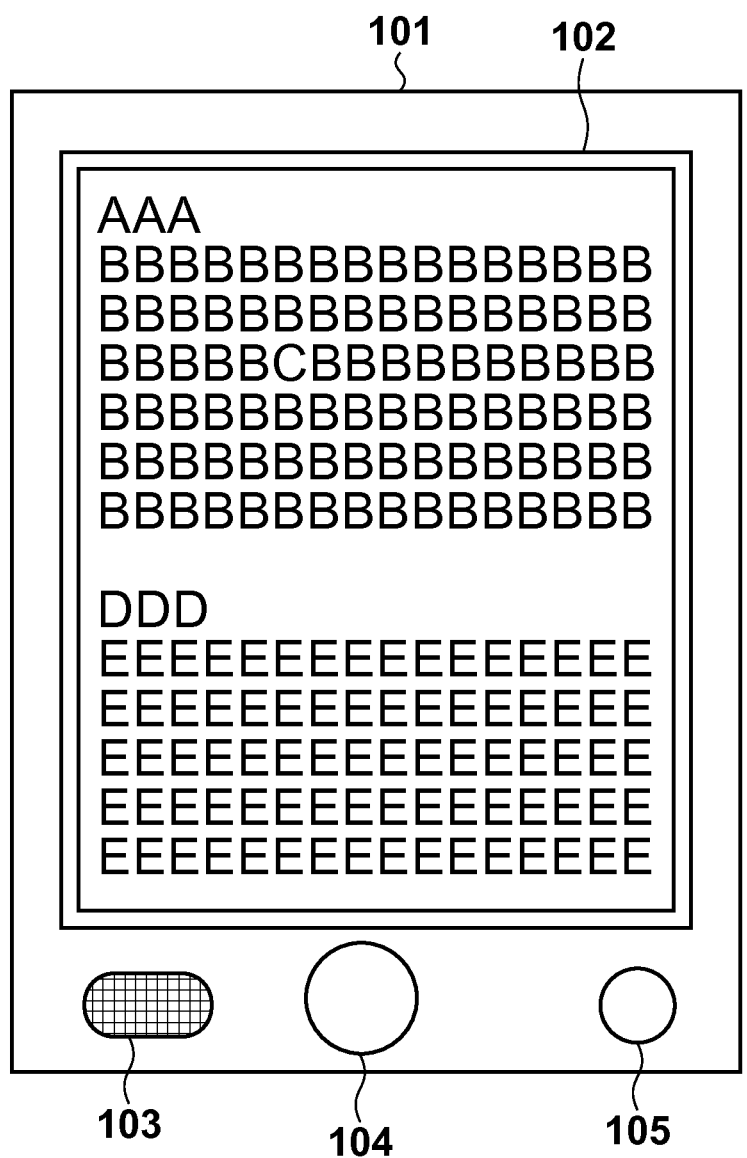
FIG. 9 is a view showing a practical display example on a touch panel screen 102.

The processing according to the flowcharts shown in FIGS. 4A and 4B will be described with reference to a practical example. A case in which a portrait orientation operation has been performed for the information processing apparatus 101, and the voice output button 104 is pressed while an electronic book (N=5) exemplified in FIG. 9 is displayed on the touch panel screen 102, as shown in FIG. 9, will be explained (each of "A", "B", "C", "D", and "E" represents one character).

In step S4011 for the first time, the voice output unit 202 specifies the speech wave data of the start character of "AAA", and supplies a voice signal based on the specified speech wave data to the loudspeaker 103. FIG. 11A shows an example of the arrangement of a voice output position stored in the memory in step S4012 at this time. Since voice output has just started, a page number "5" and the position of the start character of a block with a block ID "1" in page 5 (a line count "1" and a character count "1" from the start character of a line) are stored in the memory as a voice output position. Since the start character of "AAA" is output as a voice, a screen where the start character of the block to which the start character of "AAA" belongs is positioned at the upper left corner of the touch panel screen 102, as exemplified in FIG. 9, is specified in step S4013. In step S402, the thus specified screen (the screen of FIG. 9) is displayed on the touch panel screen 102.

Every time one of characters subsequent to the start character is sequentially output as a voice, the voice output position of the character output as a voice is stored in the memory, and a screen where the start character of a block to which the character at the voice output position belongs is positioned at the upper left corner of the touch panel screen 102 is displayed on the touch panel screen 102.

Assume that while "C" of a line "BBBBBCBB" is output as a voice, the user picks up the information processing apparatus 101 to perform a landscape orientation operation (the state of the apparatus changes from the state shown in FIG. 10A to that shown in FIG. 10B). FIG. 11B shows an example of the arrangement of a voice output position stored in the memory at this time.

In this state, in step S403, the input unit 201 detects based on an acceleration measured by the acceleration sensor 105 that the landscape orientation operation has been performed, and notifies the layout change instruction detection unit 206 of a layout change instruction.

In step S404, the layout decision unit 207 receives the notification that the landscape orientation operation has been performed from the layout change instruction detection unit 206. With this processing, the layout decision unit 207 specifies a screen in a display layout in which the electronic book can be browsed on the touch panel screen 102 placed in the landscape orientation and the character currently output as a voice is displayed on the touch panel screen 102.

Figure 12:
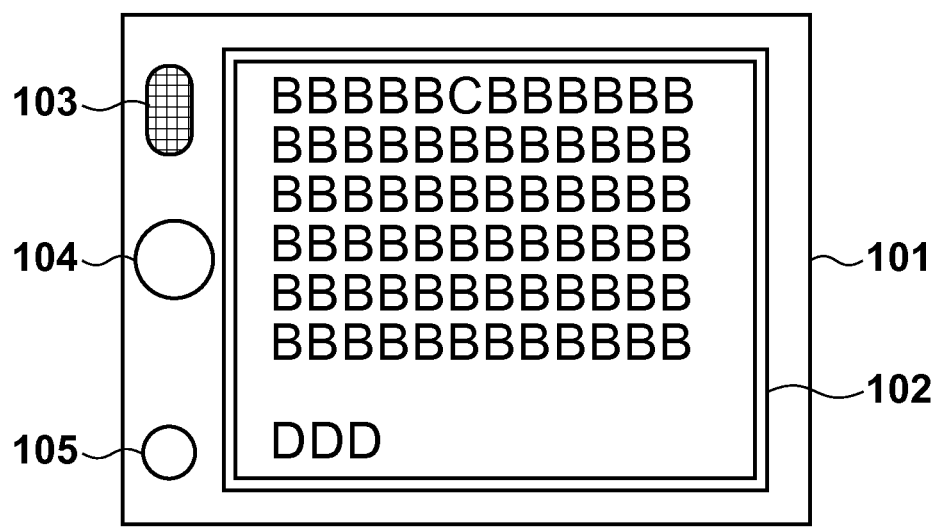
FIG. 12 is a view showing a display example on the touch panel screen 102.

FIG. 12 shows an example of such screen. As shown in FIG. 12, the landscape orientation operation has been performed for the information processing apparatus 101 and the start character of the line "BBBBBCBB" is positioned at the upper left corner of the screen with a font size of 12 mm in a layout in the landscape orientation on the touch panel screen 102. That is, a line including the character currently output as a voice and respective lines subsequent to the line are displayed. In step S405, the display unit 208 displays the electronic book display screen specified by the layout decision unit 207 on the touch panel screen 102.

As described above, according to this embodiment, it is possible to switch the electronic book display screen depending on the voice output position, thereby always displaying the character currently output as a voice on the screen.

Figure 13:
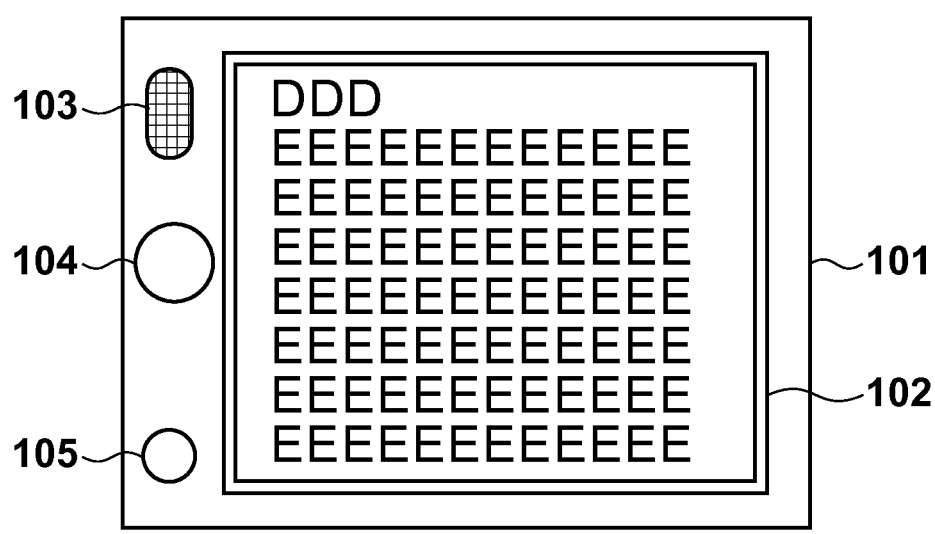
FIG. 13 is a view showing a display example on the screen after switching.

If the electronic book display screen is switched according to a currently displayed content in step S404, a switched screen is as shown in FIG. 13. If the electronic book display screen is switched according to a currently displayed content, the start character of a line at the center of the currently displayed content is positioned at the upper left corner of the screen.

The start character of a line "DDD" is placed in an upper left portion with a font size of 12 mm after changing the display layout. At this time, the voice output position is at "C" of the line "BBBBBCBB", and thus the character currently output as a voice does not exist on the screen any more. When the user browses the content along the voice output position, the content the user browsed does not exist on the screen any more after switching the screen. By switching the screen according to the voice output position, the character currently output as a voice exists on the screen even after switching the screen.

<Modification 1>

In the first embodiment, upon receiving a notification that a landscape orientation operation or portrait orientation operation has been performed, the layout decision unit 207 specifies a screen according to the received notification. In this modification, upon receiving such notification, whether a character currently output as a voice is displayed on the touch panel screen 102 is determined first. Based on the result of the determination, it is determined whether a display layout is decided according to a voice output position or a currently display content.

Figure 5:
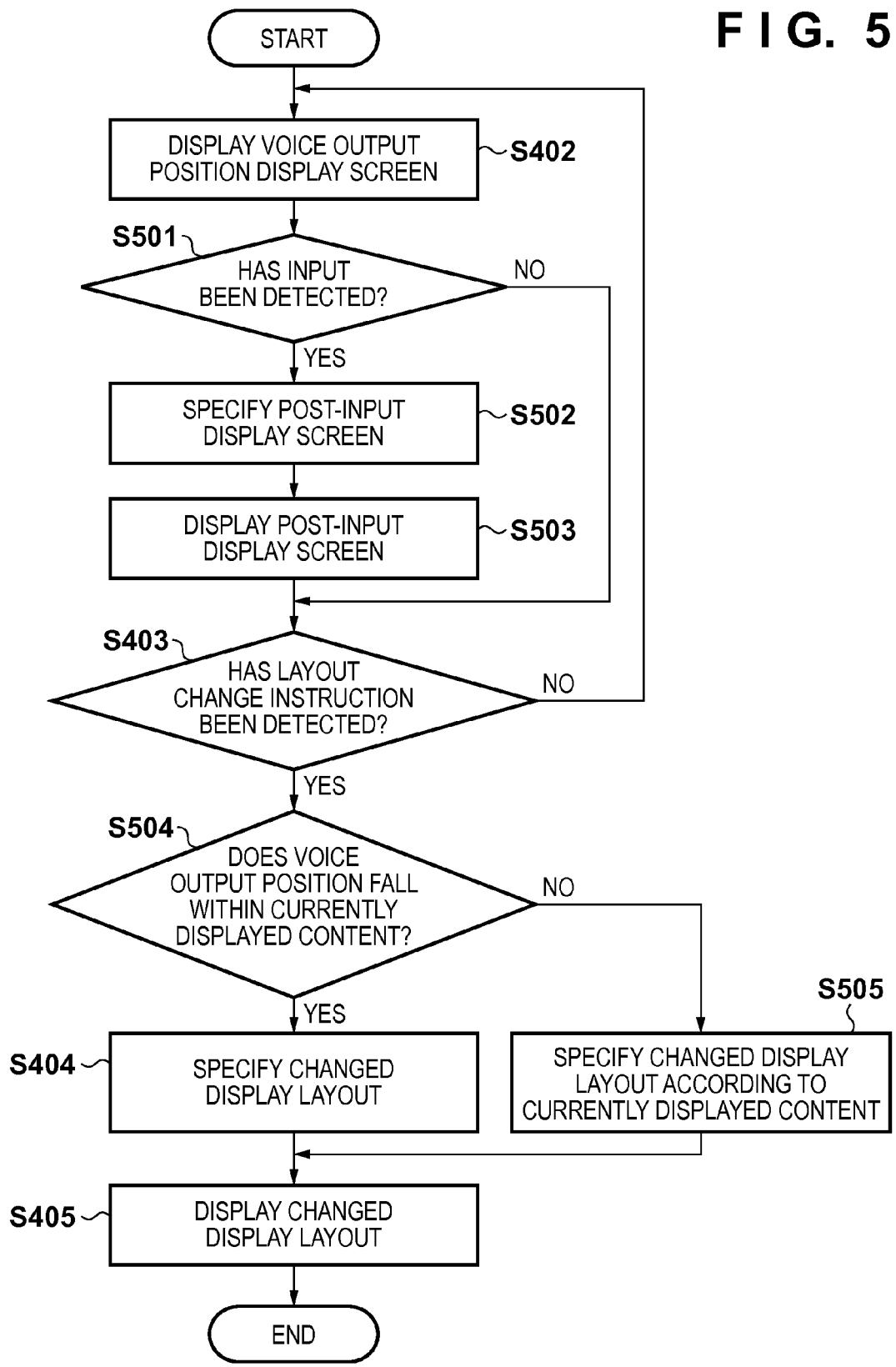
FIG. 5 is a flowchart illustrating processing executed by the information processing apparatus 101.

In this modification, processing according to a flowchart shown in FIG. 5 is performed instead of the processing according to the flowchart shown in FIG. 4A. In FIG. 5, the same reference symbols as those shown in FIG. 4A denote the same processing steps and a description thereof will be omitted.

In step S501, the input unit 201 determines whether a touch operation for the touch panel screen 102 has been detected. If it is determined that a touch operation has been detected, the process advances to step S502; otherwise, the process advances to step S403.

In step S502, a post-input display screen specifying unit 205 specifies an electronic book display screen corresponding to the touch operation detected by the input unit 201. The post-input display screen specifying unit 205 specifies a screen movement type based on the touch operation detected by the input unit 201, and specifies an electronic book display screen (post-input display screen) to be displayed on the touch panel screen 102. Note that a screen movement type corresponding to each input operation is held as dictionary data in the memory of the information processing apparatus 101. When, for example, the input unit 201 detects a flick operation in the lower direction (upper direction), the post-input display screen specifying unit 205 refers to the dictionary data to specify lower-direction scrolling (upper-direction scrolling) as a screen movement type. A display screen in the upper portion (lower portion) of an electronic book content currently displayed on the touch panel screen 102 is specified as a display target to be scrolled. The post-input display screen specifying unit 205 supplies a video signal of the display screen of the above electronic book content to the display unit 208 in the scrolling order. Assume that scrolling of the display screen is specified based on the speed of a flick operation, a contact time between a user's finger and the touch panel screen 102, and the like.

In step S503, the display unit 208 sends a video signal of the screen specified in step S502 to the touch panel screen 102, thereby displaying the screen on the touch panel screen 102.

In step S504, a voice output position determination unit 210 determines whether the character currently output as a voice is displayed on the touch panel screen 102. The voice output position determination unit 210 determines whether the voice output position falls within the currently displayed electronic book content, and specifies a character positioned within the currently displayed electronic book content by referring to SMIL description information. The unit 210 determines whether the voice output position falls within the currently displayed electronic book content by comparing information of the character positioned within the currently displayed electronic book content with information of the voice output position. If, for example, the information of the voice output position is included in the information of the character positioned within the currently displayed electronic book content, this means that the voice output position falls within the currently displayed electronic book content.

If it is determined in step S504 that the character currently output as a voice is displayed, the process advances to step S404; otherwise, the process advances to step S505.

In step S505, the layout decision unit 207 decides a display layout according to the currently displayed content. Assume, for example, that the user performs a scroll operation on the touch panel screen 102, and as a result, the character currently output as a voice is not displayed on the touch panel screen 102 any more (the character is scrolled outside the range of the display screen). In this case, the user is highly likely to ignore the voice output position to browse the content. At this time, if a display layout is decided according to the voice output position, the content the user browsed may not be displayed any more. Especially, when a screen movement amount by a scroll operation is large, the possibility becomes high. When the character currently output as a voice does not exist within the currently displayed electronic book content, a display layout is decided according to the currently displayed content, so that the content the user currently browses exists within the display layout. To the contrary, when the character currently output as a voice exists on the screen, the user is highly likely to browse the electronic book content along the voice output position. At this time, by deciding a display layout according to the voice output position, the voice output position exists within the display screen even after changing the layout. By deciding a display layout depending on whether the voice output position falls within the currently displayed electronic book content, it becomes possible to switch the display layout based on the display layout according to the voice output position and the currently displayed content.

<Modification 2>

In Modification 1, it is determined whether a display layout is decided according to the voice output position or the currently displayed content, depending on whether the character currently output as a voice is displayed on the touch panel screen 102. However, the present invention is not limited to this. It may be determined whether a display layout is decided according to the attribute of the currently displayed content, the voice output position, or the currently displayed content.

Figure 6:
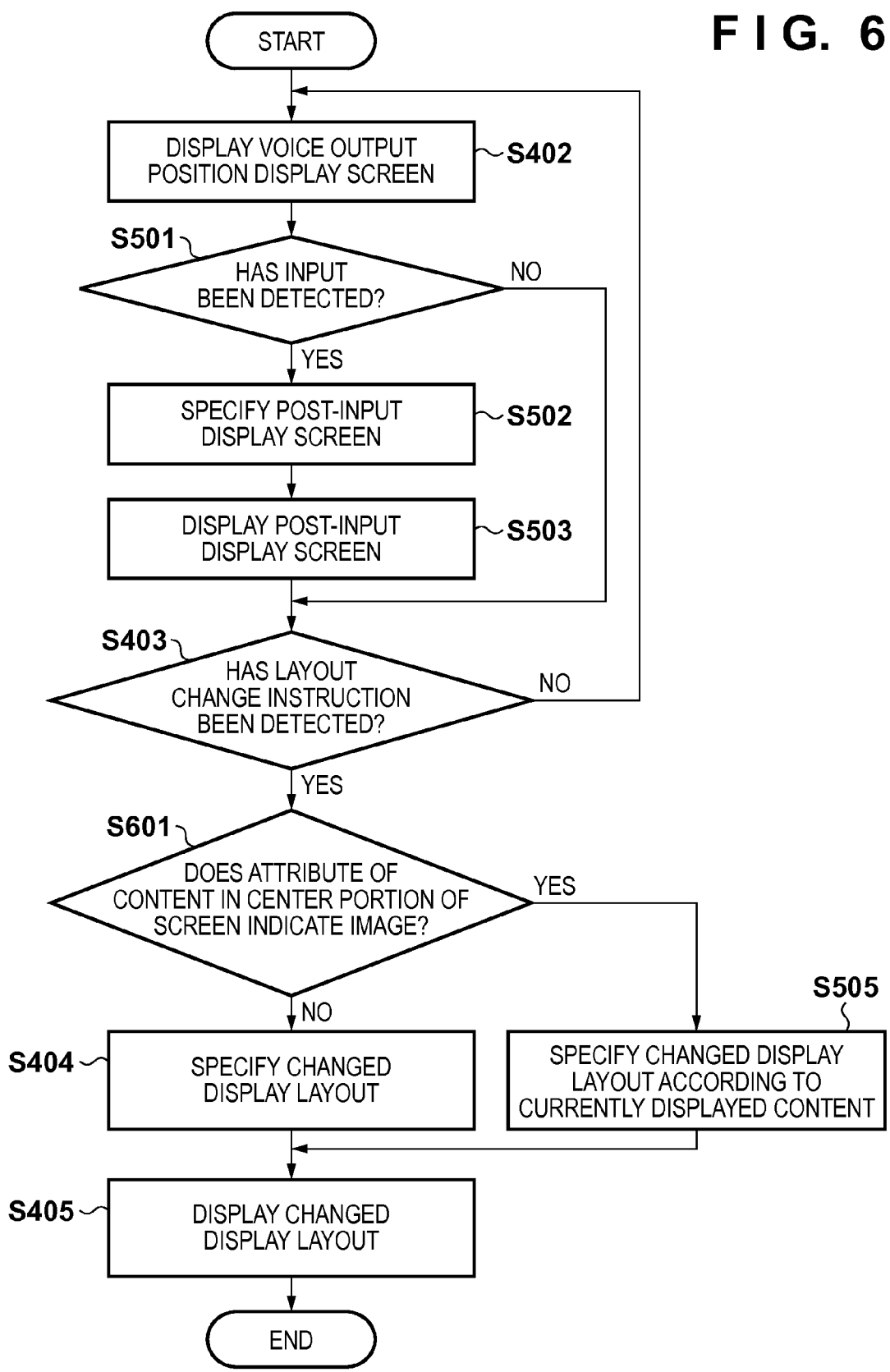
FIG. 6 is a flowchart illustrating processing executed by the information processing apparatus 101.

In this modification, processing according to a flowchart shown in FIG. 6 is performed instead of the processing according to the flowchart shown in FIG. 4A. In FIG. 6, the same reference symbols as those shown in FIGS. 4A and 5 denote the same processing steps and a description thereof will be omitted. The flowchart shown in FIG. 6 is obtained by replacing step S504 of FIG. 5 by step S601.

In step S601, an attribute determination unit 211 determines whether the attribute of a content at the center of the currently displayed electronic book content indicates a still image (or movie). This determination need only be performed by, for example, setting a region within an appropriate range from the screen center position of the touch panel screen 102 as a search region, and determining whether the search region includes a content having an attribute indicating a still image (or movie).

If it is determined that the attribute of the content at the center indicates a still image (or movie), the process advances to step S505; otherwise, the process advances to step S404.

As described above, according to this embodiment, it is possible to determine based on the attribute of the currently displayed content whether a display layout is decided according to the voice output position or the currently displayed content. Especially, when a still image (or movie) exists in the center portion of the currently displayed electronic book content and the voice output position is at a position outside the still image (or movie), the user is highly likely to browse the still image (or movie). In this case, if a display layout is decided according to the voice output position, the still image (or movie) the user currently browses highly probably falls outside the display layout. In such case, therefore, by deciding a display layout according to the attribute of the currently displayed content, the still image (or movie) the user currently browses exists within the display layout.

<Modification 3>

In Modification 1, it is determined whether a display layout is decided according to the voice output position or the currently displayed content, depending on whether the character currently output as a voice is displayed on the touch panel screen 102. However, the present invention is not limited to this. It may be determined whether a display layout is decided according to the voice output position or the currently displayed content, based on the distance between the voice output position and the position of the currently displayed content.

Figure 7:
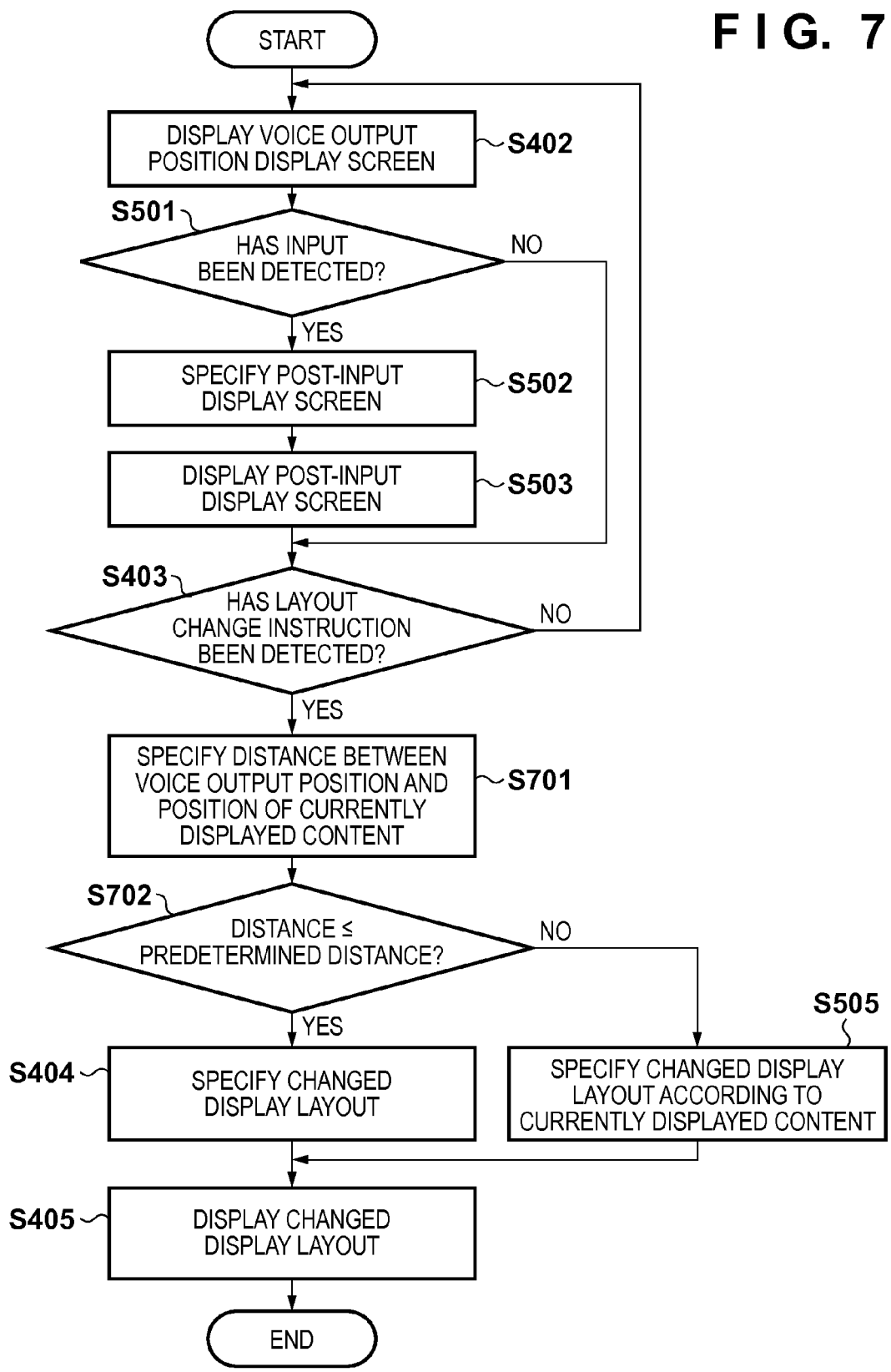
FIG. 7 is a flowchart illustrating processing executed by the information processing apparatus 101.

In this modification, processing according to a flowchart shown in FIG. 7 is performed instead of the processing according to the flowchart shown in FIG. 4A. In FIG. 7, the same reference symbols as those shown in FIGS. 4A and 5 denote the same processing steps and a description thereof will be omitted. The flowchart shown in FIG. 7 is obtained by inserting step S701 immediately after step S403 of FIG. 6 and replacing step S601 of FIG. 6 by step S702.

In step S701, a distance determination unit 209 obtains the distance between the position of the character currently output as a voice and the center line of lines displayed on the touch panel screen 102. Assume, for example, that a line at the voice output position has a page number "5", a block ID "1", and a line count "3". Assume also that the center line of the lines displayed on the touch panel screen 102 has a page number "5", a block ID "2", and a line count "5". When the total number of lines with the block ID "1" is eight, the position of the character currently output as a voice is away from the center line by 10 lines and thus the distance is 10 lines. Note that lines except for the center line, which are displayed on the touch panel screen 102, may be set as reference targets, and it is only necessary to calculate the distance between the position of the character currently output as a voice and one of the reference targets displayed on the touch panel screen 102.

In step S702, the distance determination unit 209 determines whether the distance calculated in step S701 is larger than a threshold (for example, 15 lines). If it is determined that the distance is larger than the threshold, the process advances to step S505; otherwise, the process advances to step S404.

As described above, according to this embodiment, it is possible to determine whether a display layout is decided according to the voice output position or the currently displayed content, depending on the distance between the currently displayed content and the voice output position. Especially, when the user performs a scroll operation or the like to move the display screen, the content browsing position and the voice output position are highly likely different from each other. At this time, if a display layout is decided according to the voice output position, the content the user browsed is highly likely to fall outside the display layout. When a screen movement amount by a scroll operation is large, the possibility becomes higher. When, therefore, the distance between the currently displayed content and the voice output position is larger than the threshold, a display layout is decided according to the currently displayed content, so that the content the user currently browses exists in the display layout.

<Modification 4>

In Modification 1, it is determined whether a display layout is decided according to the voice output position or the currently displayed content, depending on whether the character currently output as a voice is displayed on the touch panel screen 102. However, the present invention is not limited to this and may adopt the following determination method. That is, it may be determined whether a display layout is decided according to the voice output position or the currently displayed content, depending on the result of comparing the character size after changing the display layout with that before changing the display layout.

Figure 8:
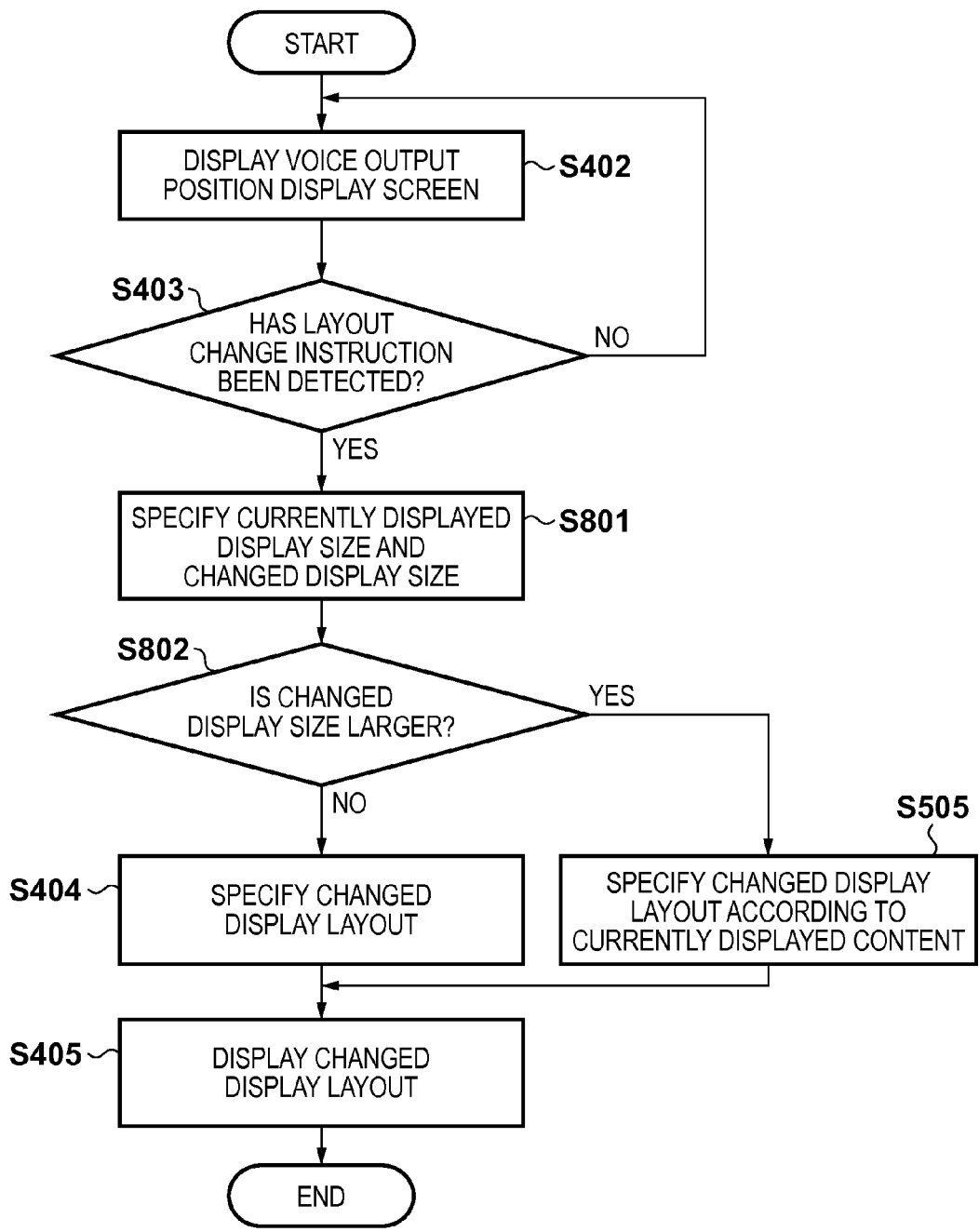
FIG. 8 is a flowchart illustrating processing executed by the information processing apparatus 101.

In this modification, processing according to a flowchart shown in FIG. 8 is performed instead of the processing according to the flowchart shown in FIG. 4A. In FIG. 8, the same reference symbols as those shown in FIGS. 4A and 5 denote the same processing steps and a description thereof will be omitted. The flowchart shown in FIG. 8 is obtained by inserting steps S801 and S802 between steps S403 and S404 of FIG. 4A.

In step S801, a display size determination unit 212 acquires a character size (for example, a font size) S1 currently displayed on the touch panel screen 102 and a character size S2 in a display layout to which the display layout is to be changed in response to a layout change instruction.

In step S802, the display size determination unit 212 determines whether S1<S2. If it is determined that S1<S2, the process advances to step S505. Alternatively, if it is determined that S1≥S2, the process advances to step S404. When, for example, a landscape orientation operation is performed and the font size changes from 4 mm to 12 mm, the display size determination unit 212 determines that S1<S2.

As described above, according to this embodiment, it is possible to determine whether a display layout is decided according to the voice output position or the currently displayed content, depending on the magnitude relationship between S1 and S2. Especially, when S1<S2, it is highly likely that the user wants to browse the currently displayed content by enlarging and displaying it. If a display layout is decided according to the voice output position at this time, a content except for the target content the user browsed may be enlarged and displayed. In this case, therefore, by deciding a display layout according to the currently displayed content, the content the user currently browses is enlarged and displayed.

Note that in the above embodiment and modifications, voice output is performed from the start character of a page. However, the present invention is not limited to this. For example, by designating a voice output start position by a touch operation and then pressing the voice output button 104, voice output may be performed from the designated voice output start position. Furthermore, although speech wave data obtained by reading aloud an electronic book content is output as a voice, an electronic book content may be output as a voice using a speech synthesis technique.

Note that in the above description, a layout change instruction is input by an orientation operation for the information processing apparatus 101. A method of inputting a layout change instruction is not limited to this. For example, when the user performs a touch operation for the touch panel screen 102, a layout change instruction may be input. A layout change instruction may be input by other operation methods, as a matter of course.

A scroll operation or zoom operation for the touch panel screen 102 may be realized by not only an operation for the touch panel screen 102 but also another operation such as a voice recognition operation or an operation for a mouse connected to the information processing apparatus 101. Furthermore, the present invention is not limited to association between a character and a voice. For example, a voice may be associated with image data or an icon button.

The first embodiment and its modifications have been explained above but they may be selectively used or used in combination, as needed.

In any case, the first embodiment and its modifications are merely examples, and show only examples of the following basic arrangement. That is, an information processing apparatus with a basic arrangement includes a display screen for displaying a document and a voice output unit for outputting each character in the document as a voice. When such information processing apparatus detects input of an instruction to change the display layout of the document on the display screen, it performs display control of the document on the display screen so that a character currently output as a voice by the voice output unit at the time of detection is displayed on the display screen.

Second Embodiment

Figure 3:
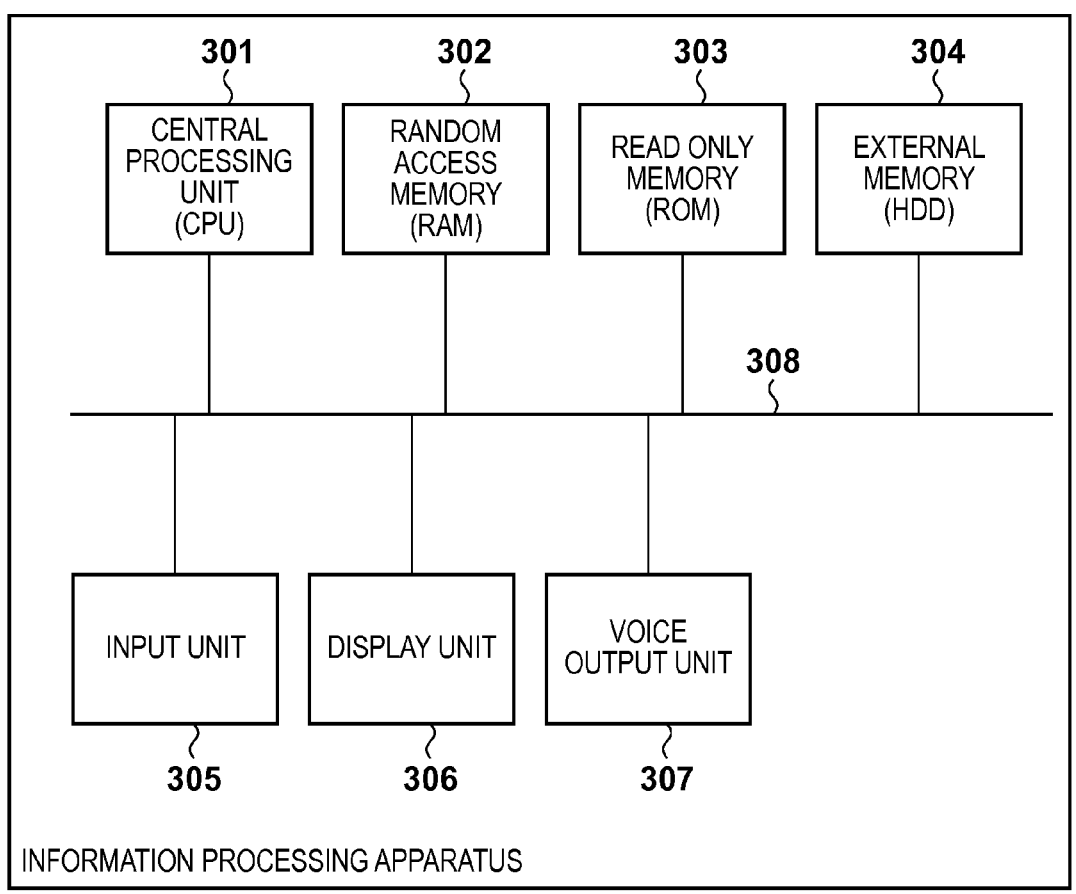
FIG. 3 is a block diagram showing an example of the hardware arrangement of an information processing apparatus 101.

Although the respective functional units shown in FIG. 2 may be implemented by hardware components, a voice output position storage unit 203 may be implemented by a memory and the remaining units may be implemented by software components (computer programs). In this case, an example of the hardware arrangement of a computer applicable to an information processing apparatus 101 will be described with reference to a block diagram shown in FIG. 3.

A CPU 301 controls the overall operation of the computer using computer programs and data stored in a RAM 302 and a ROM 303, and executes the processes described above as those performed by the information processing apparatus 101.

The RAM 302 includes an area for temporarily storing a computer program and data loaded from an external memory 304 such as an HDD (Hard Disk Drive), and a work area used by the CPU 301 to execute various processes. That is, the RAM 302 can provide various areas, as needed. The ROM 303 stores the setting data and boot program of the computer.

An input unit 305 corresponds to the above-described voice output button 104, the touch sensor of the touch panel screen 102, or the acceleration sensor 105, and can be used to input various instructions to the CPU 301, as described above. A display unit 306 corresponds to the above-described touch panel screen 102. A voice output unit 307 corresponds to the above-described loudspeaker 103.

The external memory 304 saves an OS (Operating System), and computer programs and data for causing the CPU 301 to execute the various processes described in the above embodiment and modifications. The computer programs include a computer program for causing the CPU 301 to function as each functional unit except for the voice output position storage unit 203 in FIG. 1. The data include data of an electronic book content and the data described as those already known in the above processes. The computer programs and data saved in the external memory 304 are loaded into the RAM 302, as needed, under the control of the CPU 301, and processed by the CPU 301. The above units are connected to a common bus 308.

The above-described voice output position storage unit 203 corresponds to the external memory 304 or RAM 302. Note that the information processing apparatus with the functional arrangement shown in FIG. 2 may be formed by one computer with the arrangement shown in FIG. 3 or may be formed by a plurality of apparatuses. Note also that some of the functional units shown in FIG. 1 may be implemented by hardware/software. In this case, the software is stored in the memory, and executed by the CPU 301.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-023827 filed Feb. 8, 2013 which is hereby incorporated by reference herein in its entirety.

What is claimed is:

1. An information processing apparatus including a display screen configured to display part of a document including text, the information processing apparatus comprising:
a memory storing computer instructions; and
a processor configured to implement the computer instructions stored in the memory and execute:
a voice output task that outputs, in accordance with an arrangement order of the text included in the document, a voice corresponding to the text included in the document;
a storing task that stores, in a data storage device comprising one of the memory or another storage device, position information representing a position of part, of the text in the document, corresponding to the voice currently output by the voice output task, the position information being updated in synchronization with progress of outputting the voice;
a detecting task that detects input of a user instruction to change a display layout of the document on the display screen;
a determination task that, upon the detecting task detecting the user instruction, determines whether a distance between a reference target displayed on the display screen at the time of detection and the part of the text corresponding to the voice output by the voice output task at the time of detection is not larger than a threshold; and
a display control task that, upon the detecting task detecting the user instruction, use the position information stored in the data storage device to perform display control of the document on the display screen so that the part of the text corresponding to the voice output by the voice output task at the time of detection is displayed on the display screen,
wherein when the distance is not determined to be larger than the threshold, the display control task controls the display screen to display of a line including the part of the text corresponding to the voice output by the voice output task at the time of detection and lines subsequent to the line on the display screen; and
when the distance is determined to be larger than the threshold, the display control task controls the display screen to display a center line of respective lines displayed on the display screen at the time of detection and lines subsequent to the center line on the display screen.

2. The apparatus according to claim 1, wherein the display control task:
upon the detecting task detecting the user instruction, determine whether either a still image or a movie is displayed on the display screen at the time of detection;
upon determining that neither the still image nor the movie is displayed, controls the display screen to display a line including the part of the text corresponding to the voice output by the voice output unit task at the time of detection and respective lines subsequent to the line on the display screen; and
upon determining that the still image or the movie is displayed, controls the display screen to display a center line of respective lines displayed on the display screen at the time of detection and lines subsequent to the center line on the display screen.

3. The apparatus according to claim 1, wherein the display control task:
upon the detecting task detecting the user instruction, determines whether a size of the text displayed on the display screen at the time of detection is smaller than a size of text to be displayed in the display layout changed by the user instruction;
upon determining that the size of the text displayed on the display screen is smaller than the size of the text to be displayed in the changed display layout, controls the display screen to display a line including the part of the text corresponding to the voice output by the voice output task at the time of detection and respective lines subsequent to the line on the display screen; and upon determining that the size of the text displayed on the display screen is not smaller than the size of the text to be displayed in the changed display layout, controls the display screen to display a center line of respective lines displayed on the display screen at the time of detection and lines subsequent to the center line on the display screen.

4. The apparatus according to claim 1, wherein the user instruction is input according to an operation for the information processing apparatus or a change in posture of the information processing apparatus.

5. An information processing method executable by an information processing apparatus including a display screen configured to display part of a document including text and a data storage device, the method comprising:

a voice output step of outputting, in accordance with an arrangement order of the text included in the document, a voice corresponding to the text included in the document;

a storing step of storing, in the data storage device, position information representing a position of part, of the text in the document, corresponding to the voice currently output in the voice output step, the position information being updated in synchronization with progress of outputting the voice;

a detecting step of detecting input of a user instruction to change a display layout of the document on the display screen;

a determination step of, upon the detecting step detecting the user instruction, determining whether a distance between a reference target displayed on the display screen at the time of detection and the part of the text corresponding to the voice output in the voice output step at the time of detection is not larger than a threshold; and a display control step of, upon the detecting step detecting the user instruction, using the position information stored in the data storage device, controlling the display screen to display the document so that the part of the text corresponding to the voice output in the voice output step at the time of detection is displayed on the display screen, wherein when the distance is not determined to be larger than the threshold, the display control step controls the display screen to display of a line including the part of the text corresponding to the voice output in the voice output step at the time of detection and lines subsequent to the line on the display screen; and when the distance is determined to be larger than the threshold, the display control step controls the display screen to display a center line of respective lines displayed on the display screen at the time of detection and lines subsequent to the center line on the display screen.

6. A non-transitory computer-readable storage medium storing a computer program executable by a computer to execute a method of controlling an information processing apparatus that includes a display screen configured to display part of a document including text and a data storage device, the method comprising:

a voice output step of outputting, in accordance with an arrangement order of the text included in the document, a voice corresponding to the text included in the document;

a storing step of storing, in the data storage device, position information representing a position of part, of the text in the document, corresponding to the voice currently output in the voice output step, the position information being updated in synchronization with progress of outputting the voice;

a detecting step of detecting input of a user instruction to change a display layout of the document on the display screen;

a determination step of, upon the detecting step detecting the user instruction, determining whether a distance between a reference target displayed on the display screen at the time of detection and the part of the text corresponding to the voice output in the voice output step at the time of detection is not larger than a threshold; and a display control step of, upon the detecting step detecting the user instruction, using the position information stored in the data storage device, controlling the display screen to display the document so that the part of the text corresponding to the voice output in the voice output step at the time of detection is displayed on the display screen, wherein when the distance is not determined to be larger than the threshold, the display control step controls the display screen to display of a line including the part of the text corresponding to the voice output in the voice output step at the time of detection and lines subsequent to the line on the display screen; and when the distance is determined to be larger than the threshold, the display control step controls the display screen to display a center line of respective lines displayed on the display screen at the time of detection and lines subsequent to the center line on the display screen.

7. The apparatus according to claim 1, wherein the user instruction to change the display layout of the document on the display screen includes rotating the information processing apparatus in a portrait orientation or a landscape orientation.

8. The apparatus according to claim 7, wherein:
the processor is further configured execute a layout decision that specifies:
a first display layout where the document is browsed on the display screen placed in the portrait orientation in a case where the information processing apparatus is rotated in the portrait orientation; and
a second display layout where the document is browsed on the display screen placed in the landscape orientation in a case where the information processing apparatus is rotated in the landscape orientation,
the display control task controls the display screen to display the document according to the display layout specified by the layout decision task.

9. The apparatus according to claim 1, wherein the user instruction to change the display layout of the document on the display screen includes resizing the text on the display screen.

10. The apparatus according to claim 1, wherein the voice output task continues outputting of the voice corresponding to the text included in the document in accordance with the arrangement order of the text included in the document, even when the user instruction is detected.

11. The apparatus according to claim 1, wherein the position information is determined based on Synchronized Multimedia Integration Language (SMIL).

\* \* \* \* \*